US 6,647,748 B2

(12) United States Patent
Orita (10) Patent No.: US 6,647,748 B2
(45) Date of Patent: Nov. 18, 2003

(54) DEVICE FOR CONTINUOUSLY TWISTING AN OPTICAL FIBER (75) Inventor: Nobuaki Orita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/994,605

(22) Filed: Nov. 28, 2001

(65) Prior Publication Data
US 2002/0134114 A1 Sep. 26, 2002

(30) Foreign Application Priority Data

Nov. 29, 2000 (JP) ..................... 2000-362155
Oct. 2, 2001 (JP) ..................... 2001-306523

(51) Int. Cl.$^7$ ............................. C03B 37/00
(52) U.S. Cl. ............... 65/504; 65/402; 65/529; 65/533; 57/62; 57/295
(58) Field of Search ............... 65/504, 529, 533, 65/535, 402; 57/62, 295

(56) References Cited

U.S. PATENT DOCUMENTS 5,897,680 A    4/1999   Geertman
6,076,376 A    6/2000   Onishi et al.

FOREIGN PATENT DOCUMENTS

| JP | 8-295528 | | 11/1996 |
| JP | 11-29240 | * | 2/1999 |
| JP | 11-508222 | | 7/1999 |
| JP | 2000-143277 | | 5/2000 |
| JP | 2000-344539 | | 12/2000 |
| JP | 2000-344540 | | 12/2000 |
| WO | WO 98/46536 | | 10/1998 |

OTHER PUBLICATIONS

Machine Translation of JP 11–29240.*

* cited by examiner

Primary Examiner—James Derrington
(74) Attorney, Agent, or Firm—Oblon, Spivak, McClelland, Maier & Neustadt, P.C.

(57) ABSTRACT

A device for continuously twisting an optical fiber, which can add a sufficient twist to an optical fiber, is provided. Reciprocating rollers reciprocate so that the moving direction would be opposite each other along a center axis of rotation. The optical fiber passes through a gap between the reciprocating rollers and runs in contact with the outer circumferential surface of respective reciprocating rollers in order. Reciprocation of the reciprocating rollers adds a twist to the optical fiber. When $\phi$ is a contacting angle between the optical fiber and the reciprocating rollers, F is maximum static friction of the optical fiber against the outer circumferential surface of the reciprocating rollers, and T is tension of the optical fiber, the coefficient of friction $\mu$ between the optical fiber and the outer circumferential surface of the reciprocating rollers is lead from an operational formula of $\mu=(1/\phi)\cdot\ln(F/T)$. This coefficient of friction is set at a value in a range from not less than 0.6 to not more than 0.9.

10 Claims, 7 Drawing Sheets

DEVICE FOR CONTINUOUSLY TWISTING AN OPTICAL FIBER

BACKGROUND OF THE INVENTION

Development in DWDM (dense wavelength division multiplexing) transmission technology has remarkably increased the transmission capacity of an optical fiber, recently. In order to maintain required transmission quality in such high capacity transmission, not only a wavelength dispersion characteristic of an optical fiber but also influence by polarization mode dispersion (a phenomenon that a difference in group velocity occurs between two polarized waves vertically intersecting in a cross section of an optical fiber) cannot be neglected. One of causes of the polarization mode dispersion is that a core portion of an optical fiber, which is drawn from an optical fiber preform, is not a perfect circle. When the core portion is not a perfect circle, distribution of the refractive index in a cross section of the optical fiber does also not form a shape of a perfect concentric circle, so that the polarization mode dispersion would easily occur.

To solve such problem as polarization mode dispersion, it is proposed to add a twist to an optical fiber in a process for continuously manufacturing an optical fiber from an optical fiber preform. In this proposed method, an optical fiber drawn from an optical fiber preform is coated with a coating material (such as ultraviolet-cured type of resin, for example), and then, a twist is added to the optical fiber.

A device for continuously twisting an optical fiber, which is manufactured by adding a twist to an optical fiber, is disclosed, for example, as a roller swinging type of a twisting device in the U.S. Pat. Nos. 5,298,047, 5,418,881 or 6,076,376, or as an opposed roller type of a twisting device in the Japanese Patent Application (Publication No.: 2000-143277).

SUMMARY OF THE INVENTION

The present invention provides a device for continuously twisting an optical fiber and a system for manufacturing an optical fiber using the above device. In the device for continuously twisting an optical fiber according to the invention, an optical fiber drawn from an optical fiber preform is coated with a coating material, and then, a twist is added to the optical fiber. The device for continuously twisting an optical fiber according to the invention comprising:

a reciprocating roller, which rotates with its outer circumferential surface in contact with the running optical fiber while reciprocates along a center axis of rotation to continuously add a twist to the above optical fiber, wherein the above outer circumferential surface of the reciprocating roller has a coefficient of friction $\mu$ for the optical fiber, the coefficient of friction $\mu$ being lead from an operational formula of $\mu=(1/\phi)\cdot\ln(F/T)$, wherein $\phi$ is a contacting angle between the optical fiber and the reciprocating roller, F is maximum static friction of the optical fiber against the outer circumferential surface of the reciprocating roller, and T is tension of the optical fiber, and the above coefficient of friction $\mu$ being set at a value in a range from not less than 0.6 to not more than 0.9.

BRIEF DESCRIPTION OF THE DRAWINGS

Exemplify embodiments of the invention will now be described in conjunction with drawings in which.

DETAILED DESCRIPTION

Figure 8:
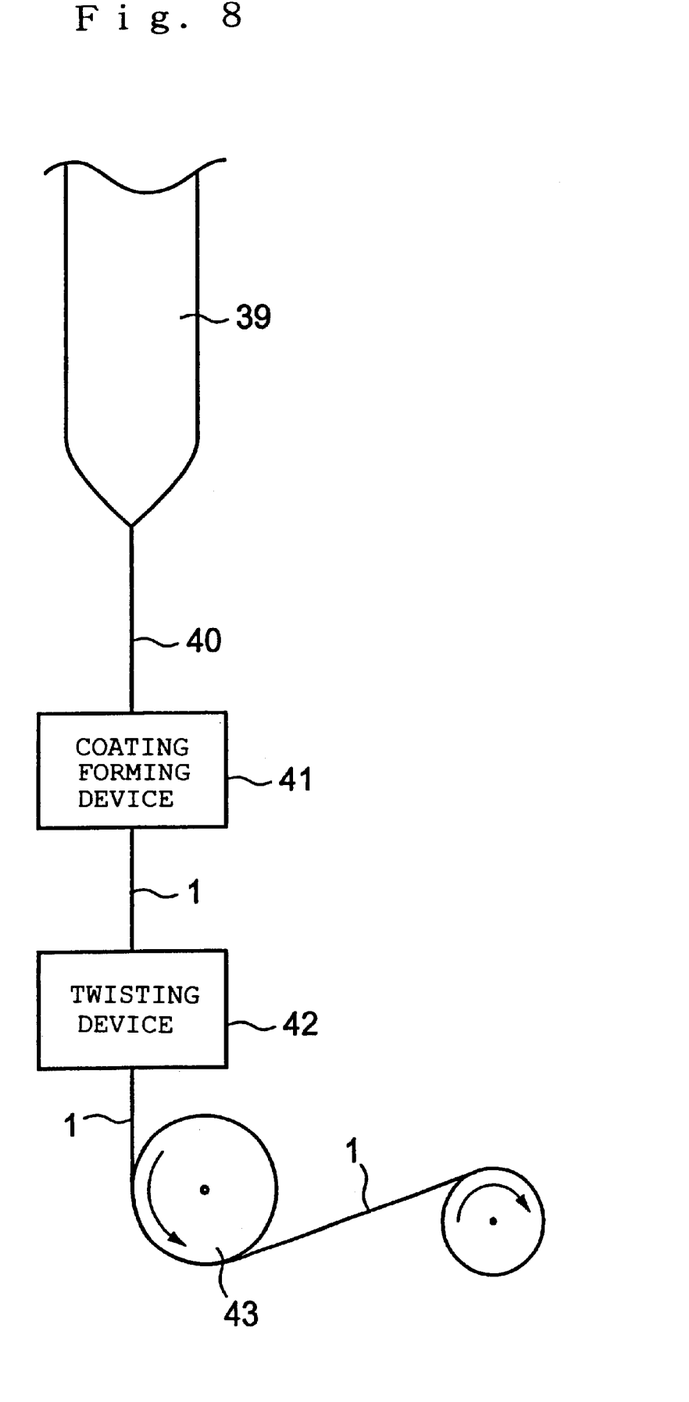
FIG. 8 shows a system for performing a series of operations such that an optical fiber is drawn from an optical fiber preform, the optical fiber is coated with a coating material, and a twist is added to the optical fiber.

FIG. 8 shows an example of a system for manufacturing an optical fiber in which a twisting device 42 is used. This manufacturing system comprises a coating forming device 41 and capstan 43 other than the twisting device 42. The coating forming device 41 forms a coating layer on an optical fiber 40, which is drawn from an optical fiber preform 39. The capstan 43 draws the coated optical fiber 1. The twisting device 42 is disposed between the coating forming device 41 and the capstan 43 so as to add a twist to the optical fiber 1 on the way of drawing.

Figure 7:
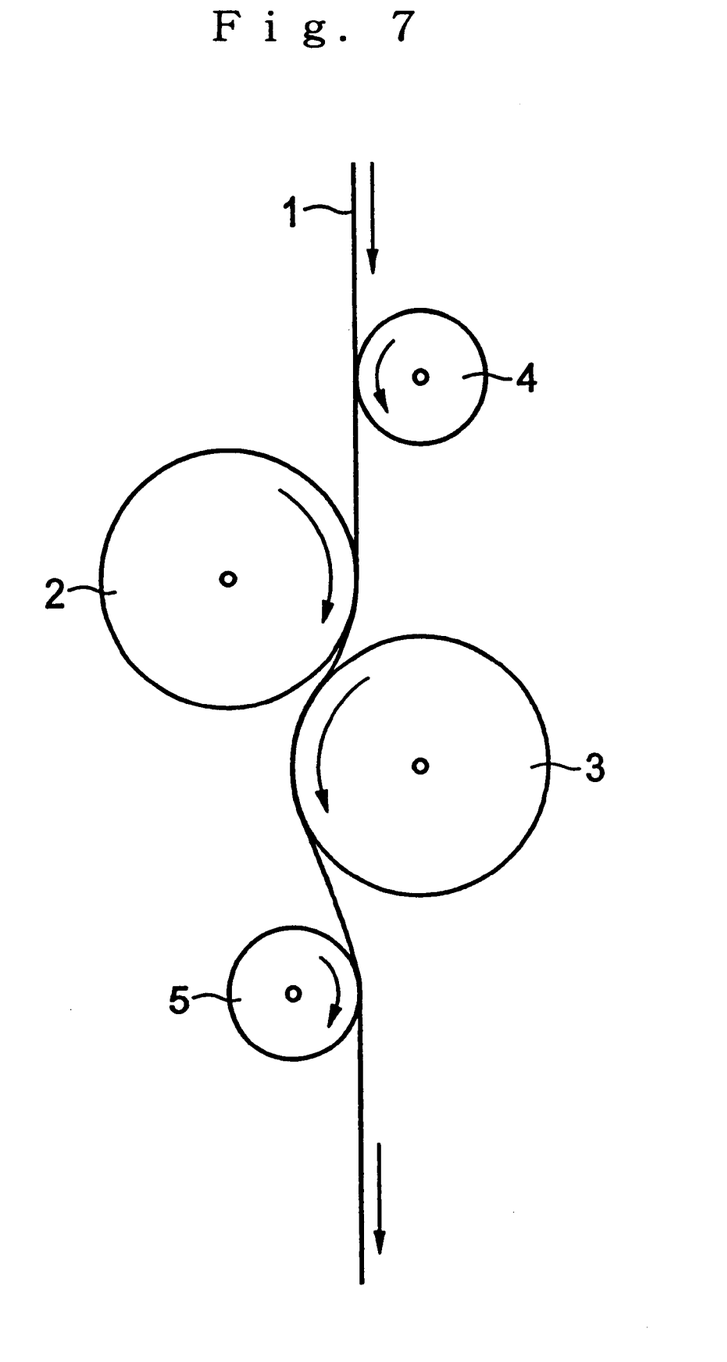
FIG. 7 is a simplified diagram of an example of arrangement of the rollers in the device for continuously twisting an optical fiber.

A concrete example of the twisting device is proposed in, for example, the Japanese Patent Application (Publication No.: 2000-143277). This twisting device includes a first reciprocating roller 2, a second reciprocating roller 3, a first guide roller (a first guide pulley) 4, and a second guide roller (a second guide pulley) 5, as shown in FIG. 7. The rollers 2 to 5 are in contact with the running optical fiber 1, respectively, and rotate as the optical fiber 1 runs.

In FIG. 7, the optical fiber 1 runs downwardly by means of the capstan 43. The first and second reciprocating rollers 2 and 3 are spaced each other and arranged alternately in the running direction of the optical fiber 1. Both of the reciprocating rollers 2 and 3 are arranged so as to be able to be in contact with the running optical fiber 1.

The twisting device in the above proposition is provided with reciprocating driving means (not shown in FIG. 7) for each of the first and second reciprocating rollers 2 and 3. The reciprocating driving means reciprocate the reciprocating rollers 2 and 3 along a center axis of rotation (that is, in a direction vertical to a sheet surface shown in FIG. 7) in the opposite moving directions respectively.

The first guide roller 4 is provided on the upstream side of the running path of the optical fiber 1 in relation to the arranged group of the reciprocating rollers 2 and 3. The second guide roller 5 is provided on the downstream side in relation to the arranged group of the reciprocating rollers 2 and 3. Each of the first and second guide rollers 4 and 5 is disposed in a fixed position to limit a running position of the optical fiber 1.

In this twisting device, the optical fiber 1 runs in contact with the first guide roller 4, the first reciprocating roller 2, the second reciprocating roller 3 and the second guide roller 5 in order. The reciprocation of the reciprocating rollers 2 and 3 adds a twist regularly to the optical fiber 1.

When the friction between the optical fiber 1 and the reciprocating rollers 2 and 3 is not large enough, however, the optical fiber 1 sometimes slips on the outer circumferential surface of the first reciprocating roller 2 or the second reciprocating roller 3. This slip makes it impossible to add a twist sufficiently to the optical fiber.

The present invention provides in one aspect a device for continuously twisting an optical fiber, which is possible to add a twist sufficiently to the optical fiber by reducing a slip of the optical fiber on a reciprocating roller.

Figure 1A:
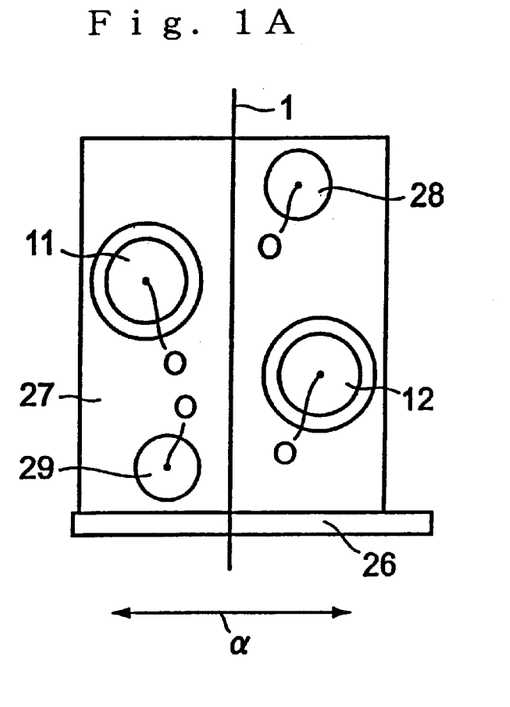
FIGS. 1A and 1B illustrate an embodiment of a device for continuously twisting an optical fiber according to the invention.
Figure 1B:
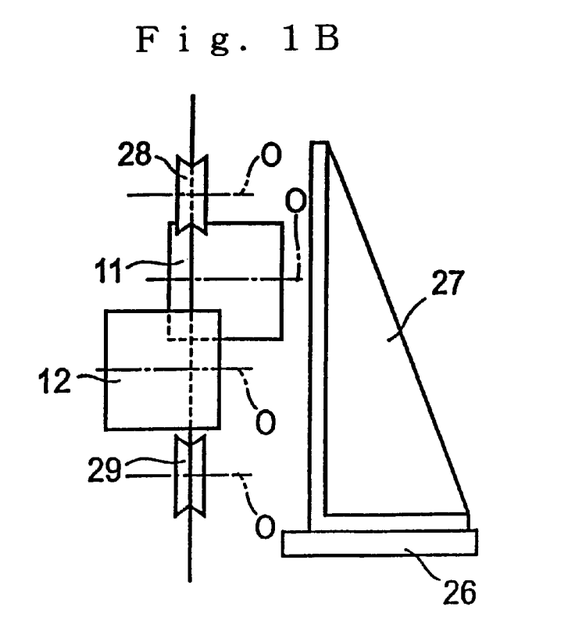

FIGS. 1A and 1B show an embodiment of a device for continuously twisting an optical fiber according to the invention. FIG. 1A is a simplified front view of the device in this embodiment, while FIG. 1B is a simplified side view from the right hand of the device for continuously twisting an optical fiber shown in FIG. 1A.

The device for continuously twisting an optical fiber in this embodiment includes a first reciprocating roller 11, a second reciprocating roller 12, a base 26, a main body frame 27, a first guide roller 28 and a second guide roller 29.

The main body frame 27 is provided in a standing condition on a base 26 so as to be able to slide on the base 26 with the four rollers 11, 12, 28 and 29 in a direction a shown in the drawings. The main body frame 27 is provided with the first guide roller 28, the first reciprocating roller 11, the second reciprocating roller 12 and the second guide roller 29 in order from the upper side alternately.

The main body frame 27 supports the first guide roller 28 through moving means (not shown). The moving means moves the first guide roller 28 in the main body frame 27 in the direction β shown in FIG. 2B. The first guide roller 28 is supported by the moving means so as to be able to rotate freely on a center axis O, which works as a rotation axis.

The second guide roller 29 is fixed to the main body frame 27 so as to be able to rotate freely on the center axis O, which works as a rotation axis.

Each of the first and second reciprocating rollers 11 and 12 is supported by the main body frame 27 through reciprocating driving means. The reciprocating driving means reciprocate the reciprocating rollers 11 and 12 along the rotation center axis O so that the reciprocating rollers 11 and 12 would move in the opposite directions, respectively. Each of the first and second reciprocating rollers 11 and 12 is supported by the reciprocating driving means so as to be able to rotate freely on the center axis O, which works as a rotation axis.

There are various kinds of arrangement of the reciprocating driving means, and any arrangement of the reciprocating driving means can be employed in this embodiment. An example of the arrangement will be described hereinafter. The arrangement of the reciprocating driving means is not limited to the one described below, of course.

Figure 3:
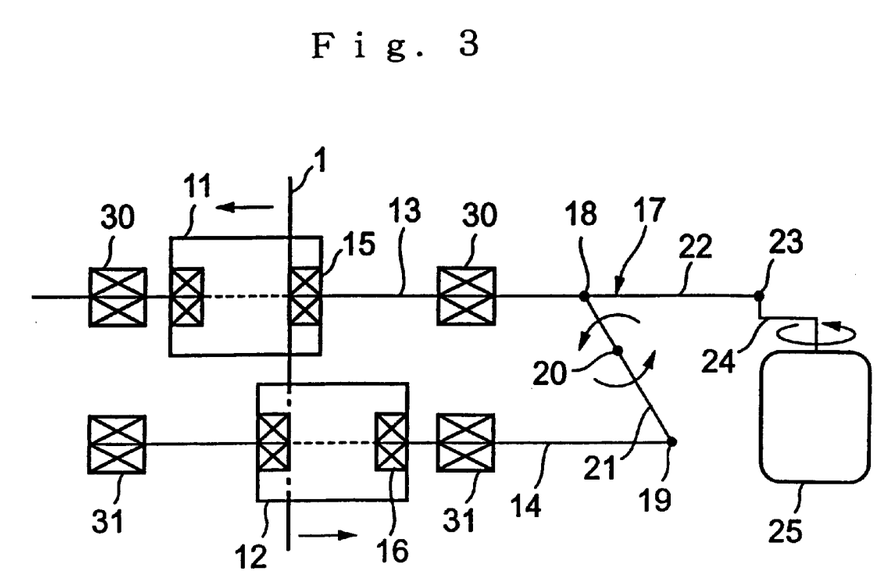
FIG. 3 illustrates an example of arrangement of reciprocating driving means for reciprocating two reciprocating rollers in the opposite directions respectively.

As shown in FIG. 3, for example, the reciprocating means 17 is arranged to comprise supporting shafts 13 and 14, a swinging shaft 21, a connecting arm 22, a crank 24 and a driving portion (a motor, for example) 25.

A first reciprocating roller 11 is mounted on one end of the supporting shaft 13, while a second reciprocating roller 12 is mounted on one end of the supporting shaft 14 similarly. Each of the other ends of the supporting shafts 13 and 14 is connected through the swinging shaft 21.

One end portion of the swinging shaft 21 is connected to the crank 24 through the connecting arm 22. The crank 24 is connected to the driving portion 25. A rotation power of the driving portion 25 reciprocates the connecting arm 22 in the right and left direction in the drawing. The swinging shaft 21 is provided with a supporting portion 20. The swinging shaft 21 swings on the supporting portion 20 by reciprocation of the connected arm 22 caused by the rotation power of the driving portion 25.

The swing of the swinging shaft 21 makes the supporting shafts 13 and 14 reciprocate respectively in the right and left direction in the drawing oppositely. The first and second reciprocating rollers 11 and 12 reciprocate in the opposite directions respectively in accordance with the reciprocation of the supporting shafts 13 and 14.

Reference numbers 15 and 16 in FIG. 3 denote a bearing portion, respectively; reference numbers 18 and 19 denote a supporting portion, respectively; and reference numbers 30 and 31 denote a ball bush, respectively. The ball bushes 30 and 31 support the supporting shafts 13 and 14 to guide sliding movement thereof.

Figure 2A:
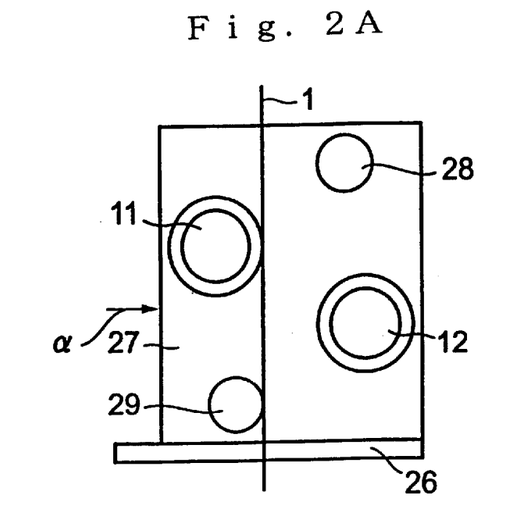
FIGS. 2A, 2B and 2C illustrate an operation of the above embodiment of the device for continuously twisting an optical fiber.
Figure 2B:
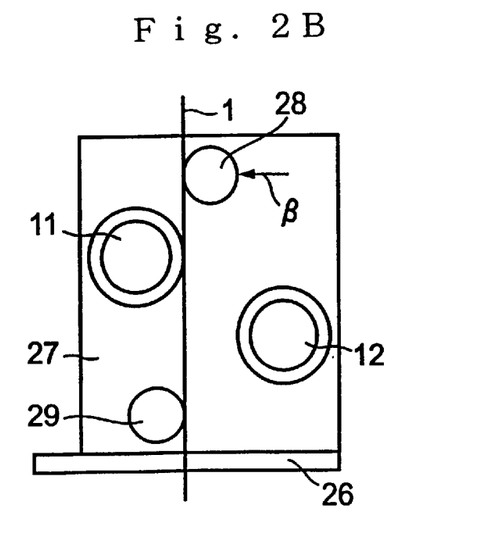
Figure 2C:
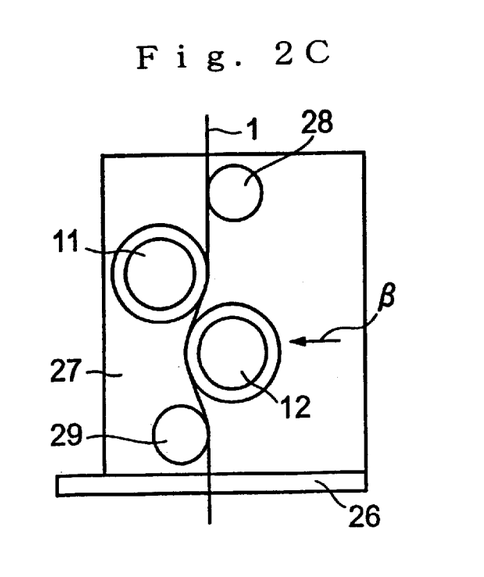

The second reciprocating roller 12 is connected to, other then the reciprocating driving means, moving means (not shown) for moving the roller 12 in the main body frame 27 in a direction β shown in FIG. 2C.

An operation of the device for continuously twisting an optical fiber of this embodiment will be briefly described hereinafter. FIG. 1A shows a waiting condition in this device for continuously twisting an optical fiber. In the waiting condition, a left side group comprising the first reciprocating roller 11 and the second guide roller 29 is separated from a right group comprising the first guide roller 28 and the second reciprocating roller 12.

First, the optical fiber 1 is provided in the above waiting condition between the left group of the first reciprocating roller 11 and the second guide roller 29 and the right group of the first guide roller 28 and the second reciprocating roller 12, for example. Then, the main body frame 27 is slid on the base 26 in the direction a as shown in FIG. 2A, and the four rollers 11, 12, 28 and 29 move in the direction α. This causes the first reciprocating roller 11 and the second guide roller 29 to be in contact with the optical fiber 1 lightly.

In this embodiment, at the above time, the locating relation of the first reciprocating roller 11 and the second guide roller 29 is determined so that both of the first reciprocating roller 11 and the second guide roller 29 can be lightly in contact with the optical fiber 1, which is maintained to be in a straight condition.

Second, the guide roller 28 is moved in the direction β toward the optical fiber 1, as shown in FIG. 2B. This movement makes the first guide roller 28 be in contact with the optical fiber 1 lightly to such an extent that the straight condition of the optical fiber 1 can be maintained.

Then, the second reciprocating roller 12 is moved in the direction β, as shown in FIG. 2C. The second reciprocating roller 12 is pushed against the optical fiber 1, so that the optical fiber 1 is bent into a curve. This makes the optical fiber 1 be pushed against and be in contact with the respective reciprocating rollers 11 and 12.

Accordingly, each of the rollers 11, 12, 28 and 29 rotates as the optical fiber 1 runs. The reciprocation of the respective first and second reciprocating rollers 11 and 12 is performed in such condition. The reciprocation of each of the first and second reciprocating rollers 11 and 12 causes to add a twist to the optical fiber 1.

When the friction between the first reciprocating roller 11 or the second reciprocating roller 12 and the optical fiber 1 is small, the optical fiber 1 easily slips on the outer circumferential surface of the first reciprocating roller 11 or the second reciprocating roller 12. In this case, a sufficient twist sometimes cannot be added to the optical fiber.

In view of the above, the inventor of the invention carried out an experiment to measure the extent of a twist of the optical fiber with various surface materials of the respective reciprocating rollers 11 and 12. In this experiment, the following three kinds of reciprocating rollers 11 and 12 are used: metal rollers whose outer circumferential surface is alumite-processed to form a solid alumite layer on the outer circumferential surface; metal rollers in which about 2 mm thickness of urethane rubber is attached to the outer circumferential surface thereof; and metal rollers in which about 15 $\mu$m thickness of epoxy resin layer is provided on the outer circumferential surface thereof.

Figure 4:
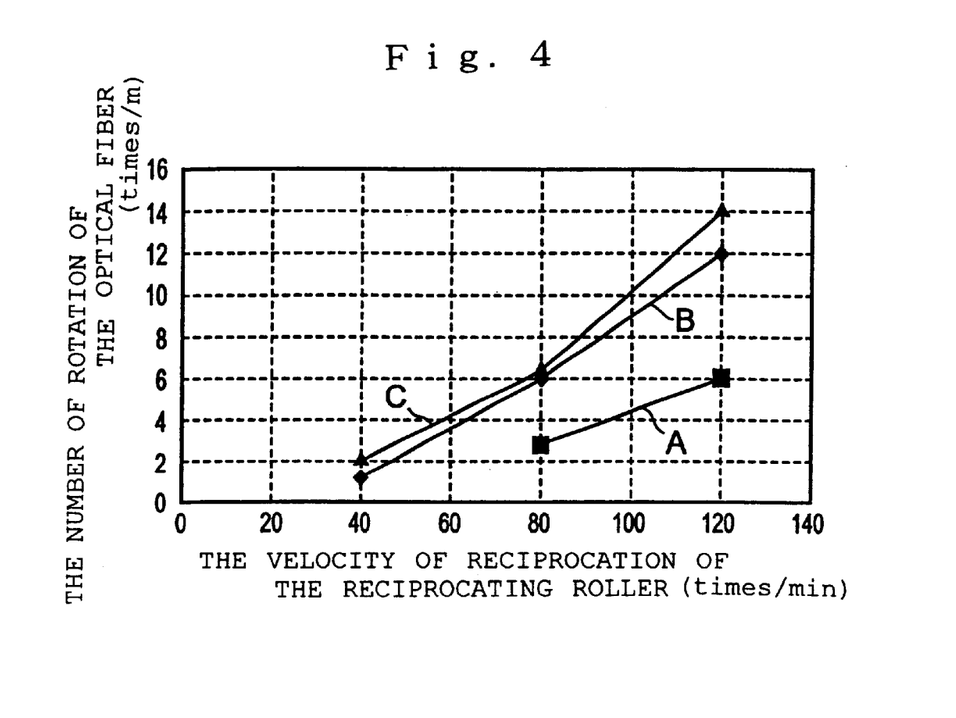
FIG. 4 is a graph showing data of relation between the reciprocating velocity of the reciprocating roller, which is calculated on the basis of an experiment carried out by an inventor of the invention, and the number of twisting of an optical fiber.

In the above experiment, examined the relation between the reciprocating velocity of the reciprocating rollers 11 and 12 and the number of twist rotation of the optical fiber for each of the above three kinds of reciprocating rollers 11 and 12. The dawing velocity of the optical fiber was about 200 m/min in the above examination. A result of the experiment is shown in FIG. 4. In FIG. 4, a solid line A shows a case of using the reciprocating rollers 11 and 12 whose outer circumferential surface layers are alumite layers. A solid line B shows a case of using the reciprocating rollers 11 and 12 whose outer circumferential surface layers are urethane rubber layers. A solid line C shows a case of using the reciprocating rollers 11 and 12 whose outer circumferential surface layers are epoxy resin layers.

Figure 5:
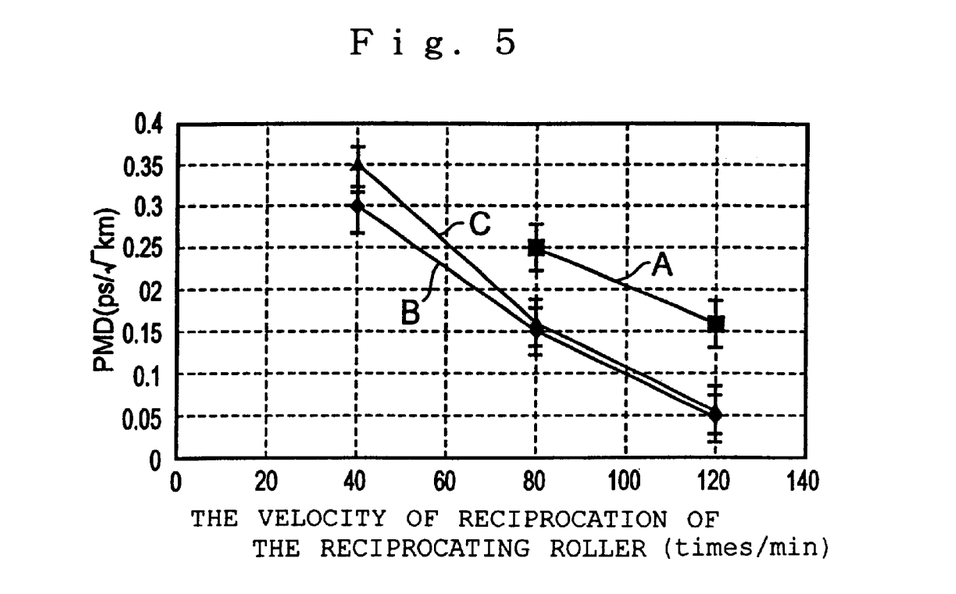
FIG. 5 is a graph showing data of relation between the reciprocating velocity of the reciprocating roller, which is calculated on the basis of an experiment carried out by an inventor of the invention, and polarization mode dispersion (PMD) of an optical fiber after twisting.

Further, the relation between the reciprocating velocity of the reciprocating rollers 11 and 12 and the polarization mode dispersion (PDM) of the optical fiber after twisting was examined for each of the above three kinds of reciprocating rollers 11 and 12. A result of the experiment is shown in FIG. 5. Reference numbers A, B and C shown in FIG. 5 denote the cases same as those of FIG. 4.

Moreover, the maximum static friction between the outer circumferential surface of the reciprocating rollers 11 and 12 and the optical fiber 1 was measured for each of the above three kinds of reciprocating rollers 11 and 12. In this measurement, the optical fiber 1 was wound to the reciprocating rollers 11 and 12, which have a 100 mm of diameter, for 90 degrees of an angle and a 50 g of load was charged on one end of the optical fiber 1. Then, the rotation of the reciprocating roller 11 and 12 was fixed, and under this condition, the other end of the optical fiber 1 was drawn to measure the maximum static friction between the surfaces of the reciprocating rollers 11 and 12 and the optical fiber 1.

When it is assumed that the coefficient of maximum static friction be F, the tension of the optical fiber caused by a charge (load) be T, the contacting angle be $\phi$, and the coefficient of friction be $\mu$, the coefficient of maximum static friction can be expressed as the following numerical formula (1):

$$F = T \cdot exp(\mu \cdot \phi) \quad (1)$$

This numerical formula (1) is used to lead out an operational formula (2) for calculating the coefficient of friction $\mu$.

$$\mu = (1/+) \cdot ln(F/T) \quad (2)$$

This operational formula (2) and the measurement result of the coefficient of maximum static friction F are used to calculate the coefficient of friction $\mu$. Table 1 shows the measurement result of the coefficient of maximum static friction F and the calculation result of the coefficient of friction $\mu$. In Table 1, reference numbers A, B and C denote the cases same as those of FIGS. 4 and 5 described above.

Table 1

|   | Maximum static friction (N) | Coefficient of friction ($\mu$) |
|---|---|---|
| A | 0.75 | 0.27 |
| B | 1.25 | 0.60 |
| C | 1.5 | 0.71 |

According to the result of the experiments shown in FIGS. 4 and 5, it is seen that the rollers using urethane rubber (refer to the solid line B) or epoxy resin (refer to the solid line C) enable about twice of twist to be added to the optical fiber and the polarization mode dispersion (PMD) to be reduced to the half or less, compared with the alumite-processed rollers (refer to the solid line A).

On the basis of these results, the inventor found that the number of twist of the optical fiber could be increased when the coefficient of friction $\mu$, which is based on the operational formula (2) of the optical fiber 1 and the reciprocating rollers 11 and 12, was set at not less than 0.6.

There is, however, likely to be deterioration of the strength of the optical fiber, which is caused by damage of a surface of the optical fiber 1 due to an excessively large coefficient of friction $\mu$ against the reciprocating rollers 11 and 12. The inventor carried out an experiment for examining a relation between the coefficient of friction $\mu$, which occurs between the optical fiber 1 and the reciprocating rollers 11 and 12, and a surface condition of the optical fiber 1. As a result, it was found that the surface of the optical fiber 1 could be prevented from being damaged when the coefficient of friction $\mu$ between the optical fiber 1 and the reciprocating rollers 11 and 12 was not more than 0.9.

On the basis of the above result, the inventor found that the outer circumferential surfaces of the reciprocating rollers 11 and 12 preferably had a coefficient of friction $\mu$ in a range from not less than 0.6 to not more than 0.9.

Accordingly, in this embodiment, the outer circumferential surfaces of the reciprocating rollers 11 and 12 are set so that the coefficient of friction $\mu$ against the optical fiber 1 would be in a range from not less than 0.6 to not more than 0.9.

There are various ways for giving such coefficient of friction $\mu$ to the outer circumferential surfaces of the reciprocating rollers 11 and 12. One of the ways, for example, is to use a material, whose coefficient of friction $\mu$ against the optical fiber 1 is in a range from not less than 0.6 to not more than 0.9, to form the outer circumferential surface layers of the reciprocating rollers 11 and 12. In this case, it is preferable to select a material forming the surface layers of the reciprocating rollers 11 and 12 not only in view of the coefficient of friction $\mu$ but also durability. In the case of epoxy resin, for example, the coefficient of friction $\mu$ can be easily changed in accordance with composition of a material and it is easy to set the coefficient of friction $\mu$ in a range from not less than 0.6 to not more than 0.9. Furthermore, the epoxy resin is superior in durability. Therefore, the epoxy resin is one of materials appropriate for the surface layers of the reciprocating rollers 11 and 12.

It is also possible to carry out a surface process on the outer circumferential surfaces of the reciprocating rollers 11 and 12 in order to increase the coefficient of friction $\mu$ so that the coefficient of friction $\mu$ of the outer circumferential surfaces of the reciprocating rollers 11 and 12 would be in a range from not less than 0.6 to not more than 0.9. As an example of the above surface process, there is a process to make the coefficient of friction $\mu$ in the above range by roughing the outer circumferential surface by means of grinding or etching; a process to make the coefficient of friction of the outer circumferential surface in the above range by attaching micro particles by means of plasma spraying, CVD or PVD; a process to make the coefficient of friction of the outer circumferential surface in the above range by means of adhesion of an adherent tape adhered thereto; and a process to make the coefficient of friction of the outer circumferential surface in the above range by forming a plurality of micro convexes or micro concaves on the outer circumferential surface, that is, by forming the outer circumferential surface uneven.

In the first guide roller 28 and the second guide roller 29, a large coefficient of friction $\mu$ on the surface contacting with the optical fiber 1 cancels a twist of the optical fiber 1, which is formed by the reciprocating rollers 11 and 12. Thus, the surfaces of the first and second guide rollers 28 and 29, which are in contact with the optical fiber 1, have a coefficient of friction $\mu$ smaller than that of the outer circumferential surfaces of the reciprocating rollers 11 and 12 in this embodiment. Such as a solid alumite layer, a solid chrome plating layer and a coating layer of DLC, TiC, TiN or CrN are available as an example of a material for an outer circumferential surface layer of the guide rollers 28 and 29.

When a system for manufacturing an optical fiber as shown in FIG. 8 is built, a device for continuously twisting an optical fiber according to the above embodiment is used instead of a twisting device 42 shown in FIG. 8. In this case, excessively narrow space between the device for continuously twisting an optical fiber and the capstan 43 may prevent the optical fiber 1 from being twisted by the reciprocating rollers 11 and 12. Thus, the device for continuously twisting an optical fiber in this embodiment is separately disposed with a space not less than 50 cm from the capstan. Accordingly, a twist can be appropriately added to the optical fiber 1 without being prevented by the capstan.

In accordance with this embodiment, the outer circumferential surface of each of the first and second reciprocating rollers 11 and 12 has a coefficient of friction $\mu$ in a range from not less than 0.6 to not more than 0.9. Thus, slip of the optical fiber 1 on the respective reciprocating rollers 11 and 12 can be limited, so that it would be possible to add a sufficient twist to the optical fiber.

Further, the surface of the optical fiber 1 can be prevented from being damaged by excessive large friction since the coefficient of friction $\mu$ is limited to not more than 0.9. Thus, the deterioration caused by surface damage in strength of the optical fiber 1 can be avoided.

In the Patent Application published in Japan (Publication No. 8-295528), there is a description that the surface of a roller for adding a twist to an optical fiber is coated with urethane system or acrylic system of resin. It is described that the optical fiber can be ideally trundled without slipping on the surface of the roller since the surface of the roller is coated with urethane or acrylic resin, so that a twist can be effectively added to the optical fiber.

There are various kinds of urethane and acrylic resin. The inventor tried to calculate a coefficient of friction $\mu$ for several kinds of urethane resin and several kinds of acrylic resin, respectively, as well as the above description. As a result, it was found that there was a large difference in a coefficient of friction even in the same urethane resin or the same acrylic resin. For example, the coefficient of friction $\mu$ of a urethane resin, which is sometimes used as a coating material of an optical fiber, is 0.3 to 0.5, while the coefficient of friction $\mu$ of urethane rubber whose hardness is 55 is 0.6.

In accordance with the experiment carried out by the inventor, it was found that even the urethane or acrylic resin could not add a twist well to the optical fiber when the coefficient of friction $\mu$ of the urethane or acrylic resin was less than 0.6. That is, all of the urethane or acrylic resin cannot add a twist well to the optical fiber. Namely, it is difficult to certainly avoid the slip of the optical fiber on the roller only by limiting a material of the surface of the roller.

Figure 6A:
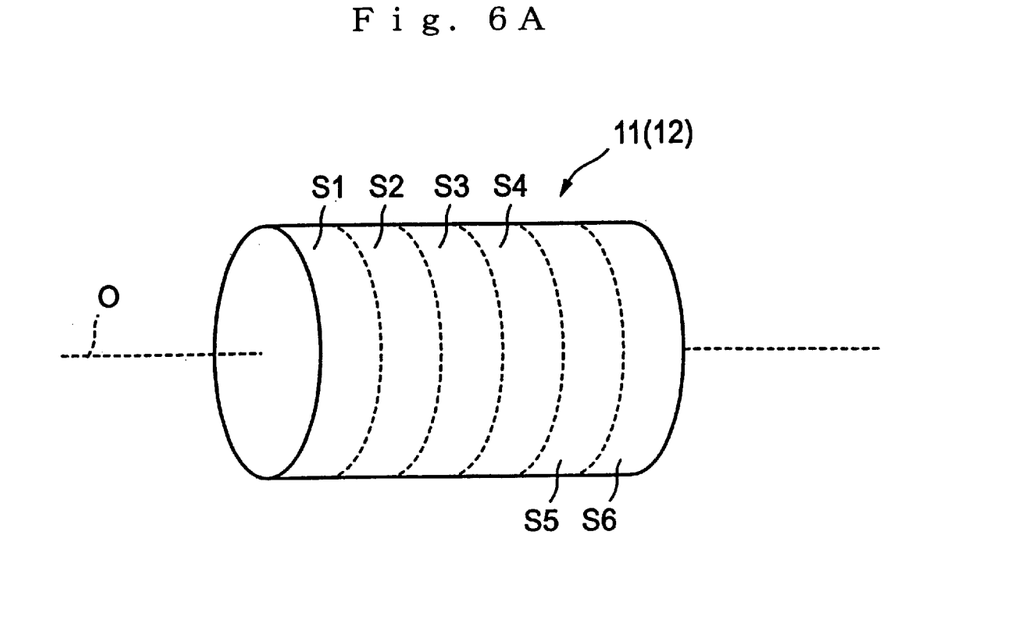
FIGS. 6A and 6B are simplified diagrams of another embodiment of the reciprocating roller.

This invention is not limited to the above embodiments and able to employ various kinds of alternative arrangement. For example, the coefficient of friction $\mu$ all over the outer circumferential surfaces of the reciprocating rollers 11 and 12 is almost same in this embodiment, but the coefficient of friction $\mu$ of the outer circumferential surfaces of the reciprocating rollers 11 and 12 can be arranged to be different in accordance with places. As shown in FIG. 6A, for example, a plurality of surface circumferential areas S1 to S6 having the different coefficient of friction $\mu$ may be disposed in a direction along the center axis of rotation O on the outer circumferential surface of the reciprocating rollers 11 and 12.

In this case, each coefficient of friction $\mu$ of the surface circumferential areas S1 to S6 may be random rather than regular such that it would be 0.7, 0.65, 0.7, 0.75, 0.65, 0.7 . . . in the order from the surface circumferential area S1, for example. Otherwise, each coefficient of friction $\mu$ of the surface circumferential areas S1 to S6 may have regularity so that the coefficient of friction $\mu$ would increase from the center part to the end part along the center axis of rotation O.

The number of the surface circumferential areas is not limited to 6 and may be any appropriate number such as 5 or less or 7 or more, of course, in the arrangement shown in FIG. 6A.

The outer circumferential surface of the reciprocating rollers 11 and 12 may be also arranged so that the coefficient of friction $\mu$ thereof would be changed continuously (rather than step by step) from one end to the other end along the center axis of rotation O, for example.

Figure 6B:
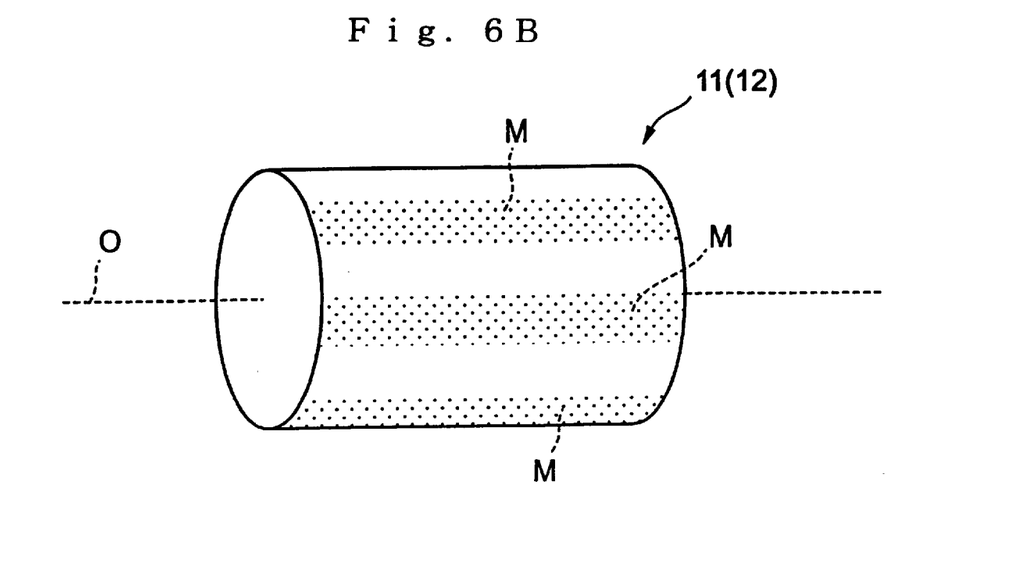

Further, the outer circumferential surface of the reciprocating rollers 11 and 12 may be arranged so that the coefficient of friction $\mu$ thereof would be different in accordance with a direction of rotation of the rollers, for example. In this case, a rough surface zone M, which extends in a direction along the center axis of rotation O, is formed intermittently on the outer circumferential surface of the reciprocating rollers 11 and 12 in the direction of rotation, as shown in FIG. 6B, for example. The rough surface zone M is processed and formed by means of a surface processing method such as providing a few $\mu$m of micro convexes and concaves, for example. The value of the coefficient of friction $\mu$, of course, may change continuously in the direction of rotation. The coefficient of friction $\mu$ in the direction of rotation of the rollers may be different in an arrangement different from that of FIG. 6B. Moreover, as an alternative example, the value of the above coefficient of friction $\mu$ may change continuously or step by step (including intermittently) in both of the direction along the center axis of rotation O of the reciprocating rollers 11 and 12 and the direction of rotation.

As described above, an arrangement that the coefficient of friction $\mu$ is different in the direction along the center axis of rotation O or an arrangement that the coefficient of friction $\mu$ is different in the direction of rotation of the rollers can increase the number of twisting the optical fiber 1, compared with an arrangement that the outer circumferential surfaces of the reciprocating rollers 11 and 12 have an equal coefficient of friction $\mu$.

Further, the number of reciprocating rollers is not limited to two and may be one, three or more, although it is two in this embodiment. The guide rollers 28 and 29 may be provided only one of the upstream side and the downstream side of the arranged group of the reciprocating rollers 11 and 12, although they are provided on both of the upstream side and the downstream side, respectively, in this embodiment.

Moreover, the first reciprocating roller 11 and the second guide roller 29 have a disposition relation such that the optical fiber 1 can be kept in an almost straight condition while both of the rollers can simultaneously be in contact with the optical fiber 1, in this embodiment, but are not limited to the above.

What is claimed is:

1. A device for continuously twisting an optical fiber, which adds a twist to the optical fiber manufactured by applying a coating material on the optical fiber drawn from an optical fiber preform, comprising:

a reciprocating roller, which rotates with its outer circumferential surface in contact with the running optical fiber while reciprocates along a center axis of rotation to continuously add a twist to the above running optical fiber, wherein the above outer circumferential surface of the reciprocating roller has a coefficient of friction $\mu$ for the optical fiber, the coefficient of friction $\mu$ being lead from an operational formula of $\mu=(1/\phi)\cdot\ln(F/T)$, wherein $\phi$ is a contacting angle between the optical fiber and the reciprocating roller, F is maximum static friction of the optical fiber against the outer circumferential surface of the reciprocating roller, and T is tension of the optical fiber, and the above coefficient of friction $\mu$ being set at a value in a range from not less than 0.6 to not more than 0.9.

2. The device for continuously twisting an optical fiber according to claim 1, wherein the outer circumferential surface of the reciprocating roller is made of a material whose coefficient of friction $\mu$ is in a range from not less than 0.6 to not more than 0.9.

3. The device for continuously twisting an optical fiber according to claim 1, wherein the outer circumferential surface of the reciprocating roller is surface-processed in order to give a coefficient of friction $\mu$ in a range from not less than 0.6 to not more than 0.9 thereto.

4. The device for continuously twisting an optical fiber according to claim 1, wherein the reciprocating roller is provided plurally, the plural reciprocating rollers are spaced each other so as to be arranged alternately in a running direction of the optical fiber, the reciprocating rollers adjacent each other are arranged to be disposed so as to reciprocate in an adverse direction, respectively, the optical fiber passes through a gap between the respective reciprocating rollers and runs in contact with the outer circumferential surface of the respective reciprocating rollers, and reciprocation of the plural reciprocating rollers adds a twist to the optical fiber.

5. The device for continuously twisting an optical fiber according to claim 1, wherein the reciprocating roller forms one or more arranged group of the reciprocating rollers, a guide roller for limiting a running position of the optical fiber is provided in a position at least on one of the upstream side and the downstream side of the arranged group of the reciprocating rollers in a running path of the optical fiber, and the coefficient of friction $\mu$ of a surface of the guide roller, which is in contact with the optical fiber, is set at a value smaller than the coefficient of friction $\mu$ of the outer circumferential surface of the reciprocating roller.

6. The device for continuously twisting an optical fiber according to claim 1, wherein plural surface circumferential areas whose coefficients of friction $\mu$ are different are provided on the outer circumferential surface of the reciprocating roller in a direction along a center axis of rotation.

7. The device for continuously twisting an optical fiber according to claim 1, wherein a surface whose coefficient of friction $\mu$ is continuously or intermittently different is provided on the outer circumferential surface of the reciprocating roller in a rotating direction of the roller.

8. The device for continuously twisting an optical fiber according to claim 1, wherein the outer circumferential surface of the reciprocating roller is made of epoxy resin.

9. A system for manufacturing an optical fiber, which continuously performs drawing of an optical fiber preform and providing of the drawn optical fiber with a coating, comprising:

a coating forming device provided on the downstream side of an optical fiber preform drawing process part for providing an outer circumferential surface of the drawn optical fiber with a coating to manufacture an optical fiber; and a device for continuously twisting an optical fiber, which is provided on the downstream side of the above coating forming device for adding a twist to the optical fiber, wherein the above device for continuously twisting an optical fiber comprises the device for continuously twisting an optical fiber according to claim 1.

10. The system for manufacturing an optical fiber according to claim 9, wherein a capstan for running the optical fiber is provided on the downstream side of the device for continuously twisting an optical fiber, and the device for continuously twisting an optical fiber is disposed separately from the above capstan with a space not less than 50 cm.

* * * * *